US005847984A

United States Patent [19]

[11] Patent Number: 5,847,984

[45] Date of Patent: Dec. 8, 1998

Mahurin

[54] COMBINATION PROPAGATE AND GENERATE CARRY LOOKAHEAD GATE

[75] Inventor: Eric W. Mahurin, Austin, Tex.

[73] Assignee: Advanced Micro Devices, Inc., Sunnyvale, Calif.

[21] Appl. No.: 895,805

[22] Filed: Jul. 17, 1997

[51] Int. Cl.[6] .......... G06F 7/50

[52] U.S. Cl. .......... 364/787.01; 364/787.04

[58] Field of Search .......... 364/787.01, 787.02, 364/787.03, 787.04

[56] References Cited

U.S. PATENT DOCUMENTS

| | | | |
|---|---|---|---|
| 4,858,468 | 8/1989 | Hwang | 364/787.04 |
| 5,276,635 | 1/1994 | Naini et al. | 364/787.04 |
| 5,508,952 | 4/1996 | Kantabutra | 364/784.04 |

*Primary Examiner*—David H. Malzahn
*Attorney, Agent, or Firm*—Conley, Rose & Tayon, PC; B. Noel Kivlin

[57] ABSTRACT

Carry lookahead adders reduce the number of logic levels required to sum two numbers. A pure carry lookahead adder, however, requires circuits with large fan-outs and fan-ins making it impractical to build for a large number of bits. Carry lookahead tree adders use a plurality of small carry lookahead adders to build a complete adder. A binary carry lookahead adder is a typical implementation of a carry lookahead tree adder. Each stage of the binary carry lookahead adder generates a propagate output and generate output from propagate and generate inputs and calculates a carry output from a carry input. A modified generate circuit is introduced which reduces the propagation delay of the generate circuit. A modified propagate circuit is introduced that ensures the inputs to the modified propagate circuit do not create a short circuit. Additionally, a combination propagate and generate circuit is introduced which reduces the number of transistors required to implement the propagate and generate circuits. Still further, a quadrature carry lookahead tree adder is discussed and a combination propagate and generate circuit for the quadrature tree adder is presented.

20 Claims, 8 Drawing Sheets

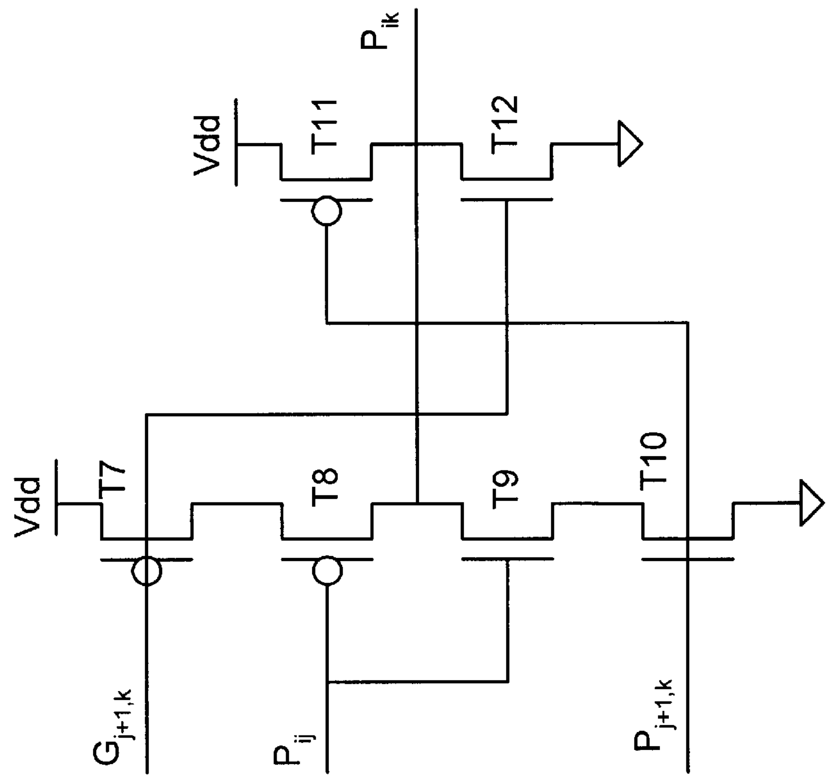
FIG. 3B
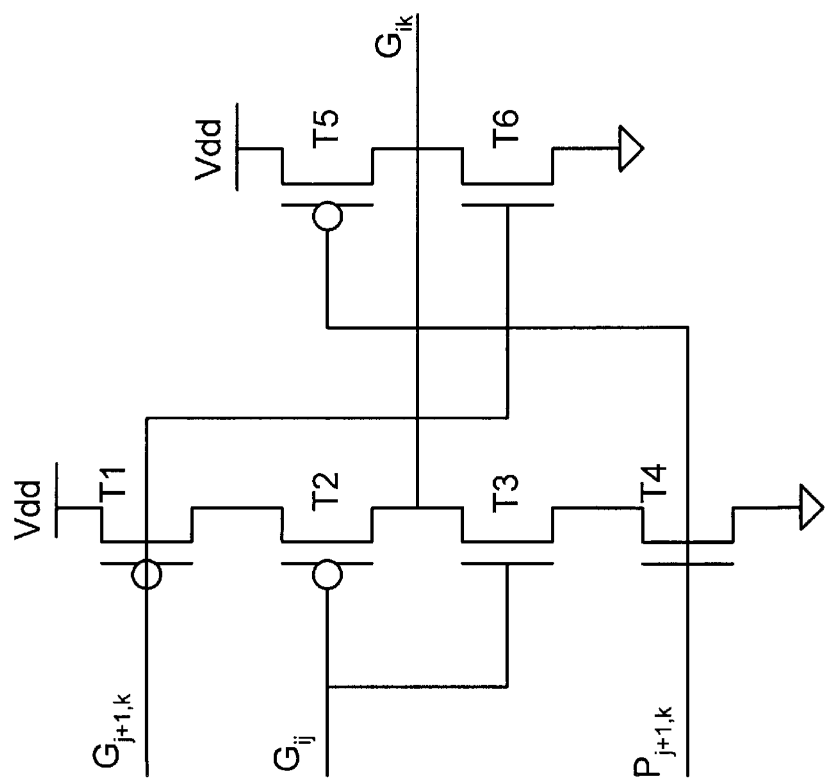
FIG, 3A

COMBINATION PROPAGATE AND GENERATE CARRY LOOKAHEAD GATE

BACKGROUND OF THE INVENTION

1. Field of the Invention

This invention relates to adders and more particularly to a combination propagate and generate gate for carry lookahead adders.

2. Description of the Relevant Art

Microprocessors determine the speed and power of personal computers and a growing number of more powerful machines, by handling most of the data processing in the machine. Microprocessors typically include at least three functional groups: the input output unit (I/O unit), the control unit, and the arithmetic-logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit to modify data contained in registers within the microprocessor.

An essential component of any ALU is the adder circuit. The adder circuit performs addition operations on two or more input operands. Because the addition operation is one of the most commonly invoked operations during the execution of a computer program, the speed with which the adder circuit can compute the sum (or difference) of two input operands is extremely important in determining the speed of the overall system.

Several common adder circuits are well known in the field of digital logic. A ripple-carry adder, for example, adds two (or possibly more) operands in much the same manner as a person would add two numbers. The least significant bit of the first operand is added to the least significant bit of the second operand (and possibly a carry-in bit) to produce a least significant result bit and a least significant carry bit. The least significant carry bit is then added to the next most significant bit of the first operand and the next most significant bit of the second operand to produce a next most significant result bit and a next most significant carry bit. This sequence continues until, eventually, the most significant bits of the operands have been added together with the carry bit from the preceding stage to produce the most significant result bit and a carry-out bit. The carry-out bit of the ripple carry adder can be used as a carry-in bit to a subsequent adder circuit such that multiple ripple carry adders can be connected together in series.

Referring now to FIG. 1A, a 4-bit ripple carry adder 10 is shown. A first operand comprising first operand bits $a_0$, $a_1$, $a_2$, and $a_3$ is added to a second operand comprising second operand bits $b_0$, $b_1$, $b_2$, and $b_3$, to produce a result comprising result bits $s_0$, $s_1$, $s_2$, and $s_3$. During a first cycle, stage 20A adds carry-in bit $c_{in}$ to least significant bit $a_0$ of the first operand and least significant bit $b_0$ of the second operand to produce a least significant bit $s_0$ of the result and a first carry bit $c_1$. During the next cycle, first carry bit $c_1$, next most significant bit $a_1$, and next most significant bit $b_1$ are added by stage 20B to produce next most significant result bit $s_1$ and second carry bit $c_2$. This procedure is repeated until carry bit $c_3$is added to most significant bit $a_3$ and most significant bit $b_3$ 4 to produce most significant bit $s_3$ and carry-out bit $c_{out}$. The inventor skilled in the art of digital circuit design will appreciate that least significant bit $s_0$ of the result is generated prior to intermediate significant result bit $s_1$ which is generated prior to most significant result bit $s_3$. Therefore, there is a time delay ($t_d$) between the generation of least significant result bit $s_0$ and most significant result bit $s_3$. If multiple adder circuits similar to the circuit depicted in FIG. 1A are connected in series such that the carry-out bit of a preceding stage forms the carry-in bit for a subsequent stage, a larger adder will result. To form a 32-bit adder, for example, eight 4-bit adders, such as the one shown in FIG. 1A, can be connected in series. With each additional stage, the time delay, $t_d$, between generation of the least significant result bit and the most significant result bit increases more or less linearly, negatively impacting the overall performance of the ALU, the microprocessor, and ultimately, the computing system as a whole. Generally speaking, the ripple carry adder requires 2N levels of logic to implement, where N is the number of bits in each operand.

A carry lookahead adder reduces the time delay to compute a sum. Each stage of the carry lookahead adder calculates $c_i$ from the known values of $a_i$ and $b_i$ rather than waiting for $c_i$ to be calculated by a previous stage. Two intermediate values are defined: a generate ($g_i$) signal and a propagate ($p_i$) signal. The following equations define $g_i$ and $p_i$:

$$g_i=a_ib_i,\ p_i=a_i+b_i.$$

The generate signal indicates that a carry is generated by that stage. If both the a input and b input to a stage are true, that stage will generate a carry and the generate signal for that stage is asserted. The propagate signal indicates that a stage will propagate a carry signal if a carry input signal is true. If the a or b input to a stage is true, the stage will propagate a carry input received. Therefore, the propagate input is defined as either a or b being true. A stage will generate a carry output if either the generate signal is true or the propagate signal is true and a carry input signal is true. Accordingly, the following equation defines the carry output of a stage:

$$c_{i+1}=g_i+p_ic_i.$$

Carry-out is identified as $c_{i+1}$ because the carry-out signal of one stage is typically the carry input signal for the subsequent stage. Using the above equation $c_i$ is defined as $g_{i-1}+p_{i-1}c_{i-1}$. In a recursive manner $c_{i-1}$ may be defined in terms of $g_{i-2}$, $p_{i-2}$ and $c_{i-2}$. Ultimately, $c_{i+1}$ may be defined by the following equation:

$$c_{i+1}=g_i+p_ig_{i-1}+p_ip_{i-1}g_{i-2}+\ldots+p_ip_{i-1}\ldots p_1g_0+p_ip_{i-1}\ldots p_1p_0c_0$$

where $c_0$ is a carry-in signal to the adder. If there is no carry-in signal, the last product term of the equation above may be eliminated. The carry-in signal for each stage of an adder can be computed concurrently using the above equation. A carry lookahead adder requires one logic level for calculating p and g for each stage and two logic levels to calculate the carry signal for each stage. Additionally, each stage requires two levels of logic to compute the sum for that counter stage. Thus, a carry lookahead adder requires five logic levels to compute a sum regardless of the number of bits in each operand. This is a significant improvement over the ripple carry adder which requires 2N logic levels to compute a sum, where N is the number of bits in each operand.

Although a carry lookahead adder requires a minimal number of logic levels, the gates of the carry lookahead adder may have a large number of inputs, or a large fan-in. For example, the computation of $c_{i+1}$ requires an OR gate with N+1 inputs. Additionally, the $p_i$ signal is an input to each AND gate required to implement the $c_{i+1}$ equation described above. Thus, the OR gate that computes $p_i$ must drive N logic gates, i.e. has a fan-out of N.

A compromise between the speed of a carry lookahead adder and the simplicity of a ripple adder is a hierarchical carry lookahead tree adder. The carry lookahead tree adder uses a plurality of small carry lookahead adders. Referring now to FIG. 1B, a hierarchical carry lookahead tree adder is shown. Tree stages 102A–102H computes p's and g's for each stage of the adder. Additionally, when $c_i$ is available, tree stages 102A–102H computes $s_i$ from $a_i$, $b_i$ and $c_i$.

The generate and propagate signals can be calculated for a group of bits. For example, $G_{01}$ indicates whether the group of bits consisting of bits 0 and 1 generates a carry-out signal. Likewise, $P_{01}$ indicates whether the group of bits 0 and 1 will propagate a carry-in signal. $G_{01}$ and $P_{01}$ are defined by the following equations:

$$G_{01}=g_1+p_1g_0$$

$$P_{01}=p_1p_0$$

$c_2$ is defined in terms of G and P as:

$$c_2=G_{01}+P_{01}c_0.$$

Further, G and P of larger groups of bits may be defined in terms of G and P of smaller groups of bits. For example, $G_{03}=G_{23}+P_{23}G_{01}$ and $P_{03}=P_{01}P_{23}$. In general terms, the following equations may be used for any j where i<j, j+1<k:

$$c_{j+1}=G_{ij}+P_{ij}c_i$$

$$G_{ik}=G_{j+1k}+P_{j+1k}G_{ij}$$

$$P_{ik}=P_{ij}P_{j+1k}$$

In FIG. 1B, tree stages 104A–104G compute G and P of larger groups of bits from G and P of small groups of bits. For example, stage 104D generates $G_{67}$ and $P_{67}$ from $g_7$, $P_7$, $g_6$ and $P_6$. Similarly, stage 104F generates $G_{47}$ and $P_{47}$ from $G_{67}$, $P_{67}$, $G_{45}$ and $P_{45}$. Eventually, stage 104G calculates $G_{07}$ and $P_{07}$ from $G_{47}$, $P_{47}$, $G_{03}$ and $P_{03}$.

Stages 104A–104G additionally generate carry signals. Stage 104G receives $c_0$ and generates $C_4$. Stage 104F generates $c_6$ from $c_4$, and stage 104D generates $c_7$ from $c_6$. As can be seen in FIG. 1B, the generate and propagate signals are generated as the signals propagate down the tree structure and the carry signals are generated as the carry signals propagate up the tree structure. Stages 102A–102H receive the carry signals and calculate the sum from the carry signals and the operand inputs (a and b). For a more detailed discussion of adders, refer to *Computer Architecture A Quantative Approach* by Hennessy and Patterson, Morgan Kaufmann Publishers, Inc., 1990, pp. A31–A39. This reference is herein incorporated by reference.

Turning now to FIG. 2, conventional circuits for generating G and P are shown. FIG. 2A illustrates a circuit that implements the equation $G_{ik}=G_{j+1k+Pj+1k}G_{ij}$. FIG. 2B illustrates a circuit that implements the propagate equation $P_{ik}=P_{ij}P_{j+1k}$. The generate and propagate circuits are designed for both positive and negative logic. Accordingly, the circuits can be cascaded without inverting signals between stages.

What is desired is a faster and smaller circuit for implementing the propagate and generate signals of a carry lookahead adder.

SUMMARY OF THE INVENTION

The present invention modifies the generate circuit shown in FIG. 2A such that the drain of T5 is coupled to voltage source Vdd rather than to the source of T1. This modification allows the size of transistor T5 to be reduced. Because Vdd is separated from the output by only one transistor, the size of transistor T5 can be reduced while maintaining the same voltage drop from Vdd to the output as a conventional circuit. Reducing the size of transistor T5 reduces the input capacitance to input $P_{j+1k}$, thereby increasing the operation speed of the propagate circuit. To prevent a drive fight, or short between two transistors of the modified propagate circuit, $P_{j+1k}$ cannot be low at the same time that $G_{j-1k}$ is high. To prevent the occurrence of this condition, the propagate circuit is modified. The modified propagate circuit is symmetrical with the generate circuit except the $G_{ij}$ input of the generate circuit is replaced with $P_{ij}$.

The present invention takes advantage of the symmetry of the generate and propagate circuit to combine the propagate and generate circuits into one circuit. The combination circuit reduces the number of transistors required to implement the generate and propagate circuits and increases the speed of the circuits.

Broadly speaking, the present invention contemplates a combined generate and propagate circuit in a carry lookahead adder, including a generate output node, a propagate output node, and ten switches. A first pair of switches comprises a first switch coupled between a first potential and the propagate output node and a second switch coupled between the first potential and the generate output node. A second pair of switches comprises a third switch coupled between a second potential and the propagate output node, and a fourth switch coupled between the second potential and the generate output node. A third pair of switches comprises a fifth switch coupled between a third node and the propagate output node, and a sixth switch coupled between the third node and the generate output node. A fourth pair of switches comprises a seventh switch coupled between a fourth node and the propagate output node, and an eighth switch coupled between the fourth node and the generate output node. A ninth is switch operably coupled between the first potential and the third node. A tenth switch is operably coupled between the second potential and the fourth node.

The present invention further contemplates a combined generate and propagate circuit in a carry lookahead adder including a generate output node, a propagate output node and twenty-two switches. A first switch is coupled between a third node and the propagate output node. A second switch is coupled between a fourth node and the propagate output node. A third switch is coupled between the third node and the generate output node. A fourth switch is coupled between the fourth node and the generate output node. A fifth switch is coupled between a fifth node and the propagate output node. A sixth switch is coupled between a sixth node and the propagate output node. A seventh switch is coupled between the fifth node and the generate output node. A eight switch is coupled between the sixth node and the generate output node. A ninth switch is coupled between a seventh node and the propagate output node. A tenth switch is coupled between a eighth node and the propagate output node. A eleventh switch is coupled between the seventh node and the generate output node. A twelfth switch is coupled between the eighth node and the generate output node. A thirteenth switch is coupled between a first potential and the propagate output node. A fourteenth switch is coupled between a second potential and the propagate output node. A fifteenth switch is coupled between the first potential and the generate output node. A sixteenth switch is coupled between the second potential and the generate output node. A seventeenth switch operably is coupled between the third node and the fifth node. A eighteenth switch operably is coupled between the fourth node and the sixth node. A nineteenth switch operably is coupled between the fifth node and the seventh node. A twentieth switch operably is coupled between the sixth node and the eighth node. A twenty-first switch operably is coupled between the seventh node and the first potential. A twenty-second switch operably is coupled between the eighth node and the second potential.

BRIEF DESCRIPTION OF THE DRAWINGS

Other objects and advantages of the invention will become apparent upon reading the following detailed description and upon reference to the accompanying drawings in which:

FIG. 3A is a circuit diagram of an improved generate circuit.

FIG. 3B is a circuit diagram of an improved propagate circuit.

Figure 1A:
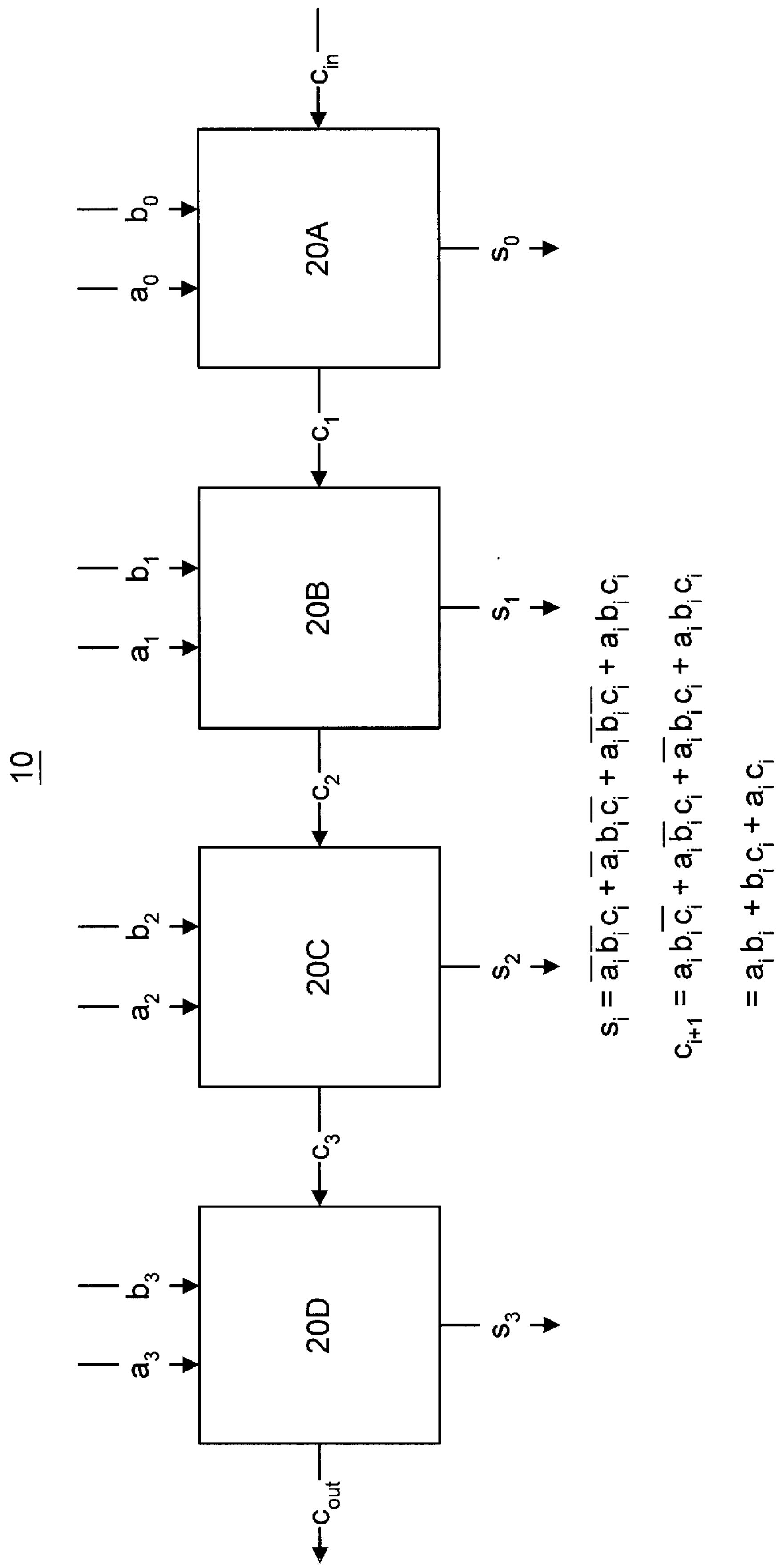
FIG. 1A is a block diagram of one embodiment of a ripple carry adder.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 3A, a circuit diagram of an improved generate circuit is shown. The generate circuit includes p-channel transistors T1, T2 and T5, and n-channel transistors T3, T4 and T6. A drain of transistor T1 is coupled to Vdd, a gate of T1 is coupled to input $G_{j+1k}$, and a source of T1 is coupled to a drain of T2. A source of T2 is coupled to a source of T3, a source of T5, a source of T6, and a generate output ($G_{ik}$). The gate of T2 is coupled to input $G_{ij}$. The drain of T3 is coupled to the source of T4. The gate of T3 is coupled to the $G_{ij}$ input. The gate of T4 is coupled to input $P_{j+1k}$. The drain of T4 is coupled to ground. The drain of T5 is coupled to power source Vdd. The gate of T5 is coupled to $P_{j+1k}$. The source of T5 is coupled to the source of T6, the source of T2, the source of T3, and the generate output. The gate of T6 is coupled to the $G_{j+1k}$ input. The source of T6 is coupled to ground.

Figure 2B:
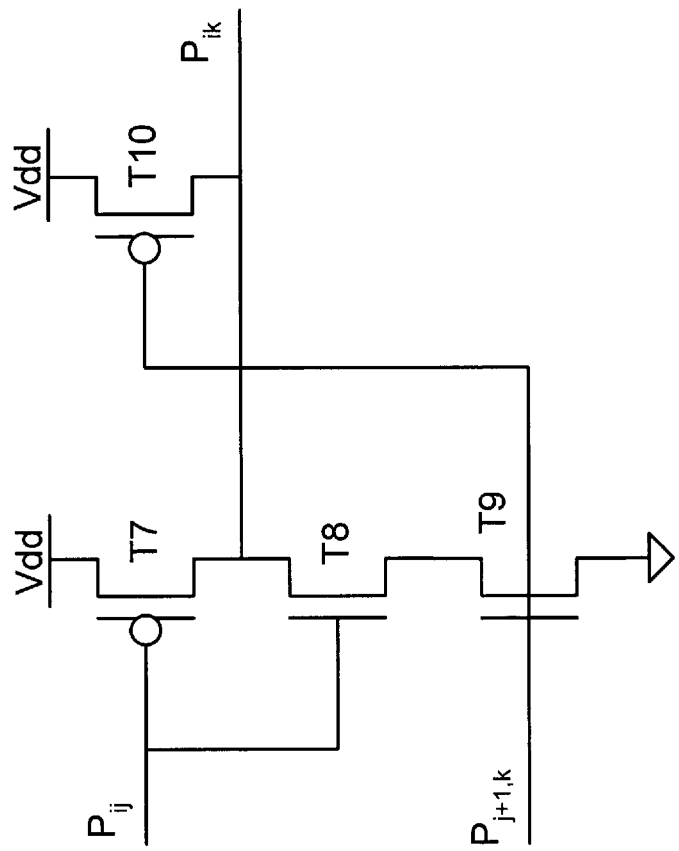
FIGS. 2A and 2B are circuit diagrams illustrating conventional implementations for generate and propagate circuits.
Figure 2A:
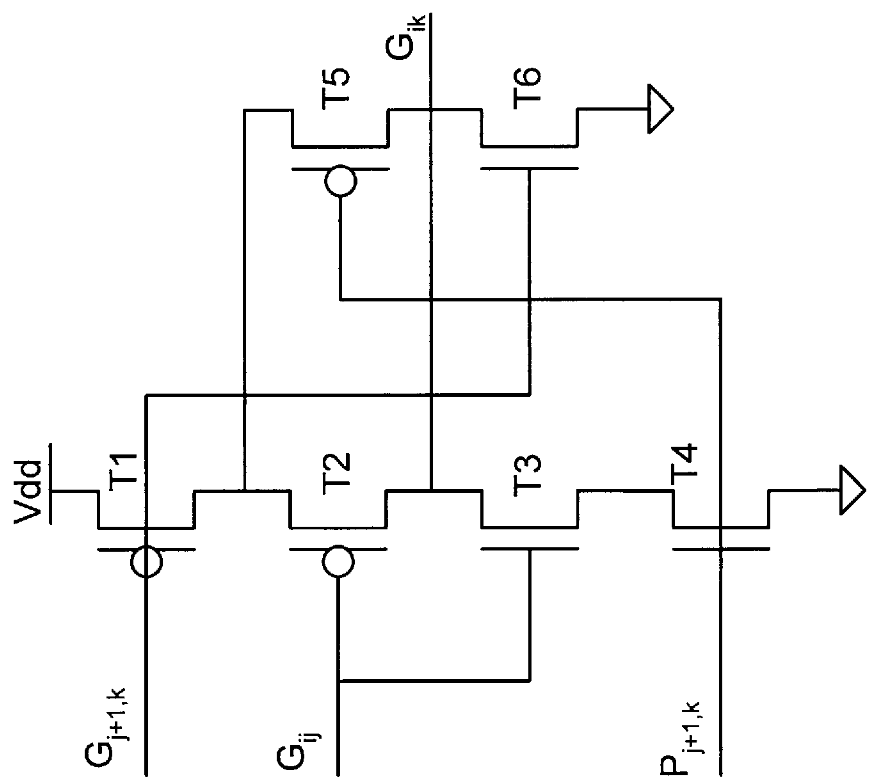

One improvement of the generate circuit shown in FIG. 3A over the generate circuit shown in FIG. 2A is that the drain of T5 is coupled to the Vdd rather than to the source of T1. Connecting the drain of T5 to Vdd has several advantages. When the generate output is pulled high, only one transistor is coupled between Vdd and the generate output. Accordingly, the series resistance between Vdd and the generate output is reduced from a conventional implementation. This allows the size of transistor T5 to be reduced while maintaining the series resistance between Vdd and the generate output of a conventional implementation. The size of a transistor is inversely proportional to the series resistance of the transistor. Therefore, reducing the size of a transistor increases the series resistance between drain and source. Because the improved circuit illustrated in FIG. 3A has one transistor between Vdd and the generate output rather than two transistors in a conventional generate circuit, transistor T5 of the improved circuit can be approximately half the size of transistor T5 in FIG. 2A without increasing the series resistance between Vdd and the generate output.

Reducing the size of a transistor also decreases the input capacitance of a transistor, which decreases the switching time of the previous stage. If T5 of the improved generator circuit is smaller than T5 of conventional generate circuits, the input capacitance of T5 is smaller. The smaller input capacitance reduces the time delay from the transition of the gate signal to the transistor turning on, or entering a low impedance mode. In the generate circuit illustrated in FIG. 3A, reducing the size of transistor T5 decreases the time delay from the transition of signal $P_{j+1k}$ from high to low or low to high.

One limitation of the generate circuit illustrated in FIG. 3A is that a short circuit condition arises when $G_{j+1k}$ is high while $P_{j+1k}$ is low. When $P_{j+1k}$ is low, transistor T5 is turned on and the generate output is coupled to Vdd through the low on-resistance of T5. When input $G_{j+1k}$ is high, T6 enters a low impedance mode and couples the generate output to ground through the low on-resistance of T6. The combination of transistors T5 and T6 being in a low impedance mode concurrently creates a low impedance path, or short, between Vdd and ground. This obviously undesirable condition can be avoided by preventing $G_{j+1k}$ from being high at the same time that $P_{j+1k}$ is low. In one embodiment, this is accomplished by modifying the propagate circuit.

As discussed above, a conventional propagate circuit implements the equation $P_{ik}=P_{ij}P_{j+1k}$. Using this equation, it is possible for $P_{ik}$ to be low at the same time as $G_{ik}$ is high, and therefore possible for $P_{j+k}$ to be low at the same time as $G_{j+1k}$ is high. To prevent this condition the propagate equation is modified. In one embodiment, the equation for $P_{ik}$ is modified to:

$$P_{ik}=G_{j+1k}+P_{j+1k}P_{ij}=P_{j+1k}(G_{j+1k}+P_{ij})$$

Using the modified equation, $P_{ik}$ is never low when $G_{ik}$ is high. $G_{ik}$ ($G_{ik}=G_{j+k\ +Pj+1k}+G_{ij}$) is high under two conditions either $G_{j+1k}$ is high, or both $P_{j+1k}$ and $G_{ij}$ are high. If $G_{j+1k}$ is high, then $P_{ik}$ will also be high. If $P_{j+1k}$ is high, then $P_{ik}$ will be high if $P_{ij}$ is high. Accordingly, $G_{j+1k}$ is not high while $P_{j+1k}$ is low unless $G_{ij}$ is high while $P_{ij}$ is low. This relationship can be extended to indicate that $G_{j+1k}$ is not high while $P_{j+1k}$ is low unless $g_i$ is high while $p_i$ is low. Using the equations for $g_i$ ($g_i=a_ib_i$) and $p_i$ ($p_i=a_i+b_i$) is it apparent that $g_i$ cannot be high while $p_i$ is low. Thus, the condition that causes a short circuit in the generate circuit is not encountered using the modified propagate equation.

Put in other terms, from the equations $g_i=a_ib_i$ and $p_i=a_i+b_i$ it can be seen that ~pigi=0. Further using the modified equations for $P_i$ and $G_i$, it can be shown that $\sim P_{01}G_{01}=0$; and further extrapolated to show that $\sim P_iG_i=0$. As discussed above, $G_{01}=g_1+p_1g_0$ and $P_{01}=g_1+p_1p_0$. The only way for $P_{01}$ to be low, when $G_{01}$ is high is for $p_0$ to be low while $g_0$ is high. Accordingly, because $\sim p_0g_0=0$, $\sim P_{01}G_{01}=0$. This same relationship holds for Pi and Gi.

The propagate equation now mirrors the generate equation and the circuit of FIG. 3A may be used to calculate the propagate signal. FIG. 3B illustrates the circuit for generating a propagate signal according to one embodiment of the present invention. The circuit is the same as the generate circuit except $G_{ij}$ is replaced with $P_{ij}$.

Figure 3C:
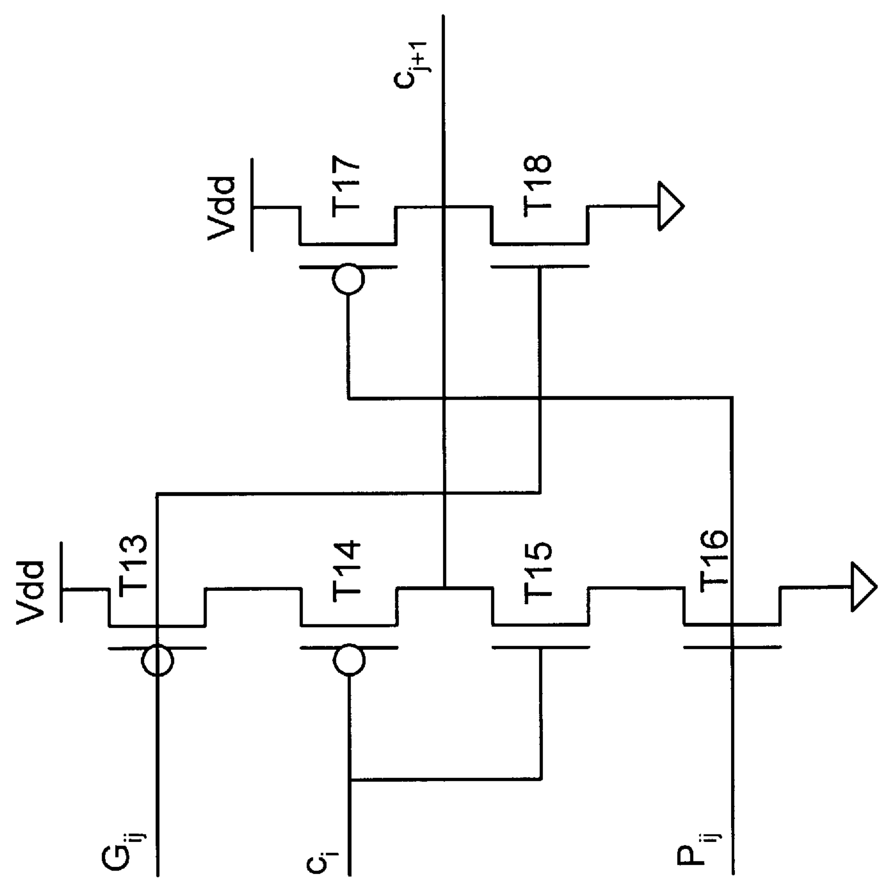
FIG. 3C is a circuit diagram of an improved carry circuit.

Turning now to FIG. 3C, a circuit for generating a carry-out signal is shown. The equation for the carry-out signal mirrors the equation for the generate signal and propagate signal. The carry-out signal is calculated using the following equation:

$$c_{j+1}=G_{ij}+P_{ij}c_i.$$

The same circuit used for the propagate and generate signals shown in FIGS. 3A and 3B may be used to calculate the carry-out signal. Like the propagate and generate circuits, $G_{ij}$ cannot be high while $P_{ij}$ is low for the carry circuit to operate correctly. As discussed above, the modified propagate circuit of FIG. 3B ensures that this condition does not occur.

Figure 4:
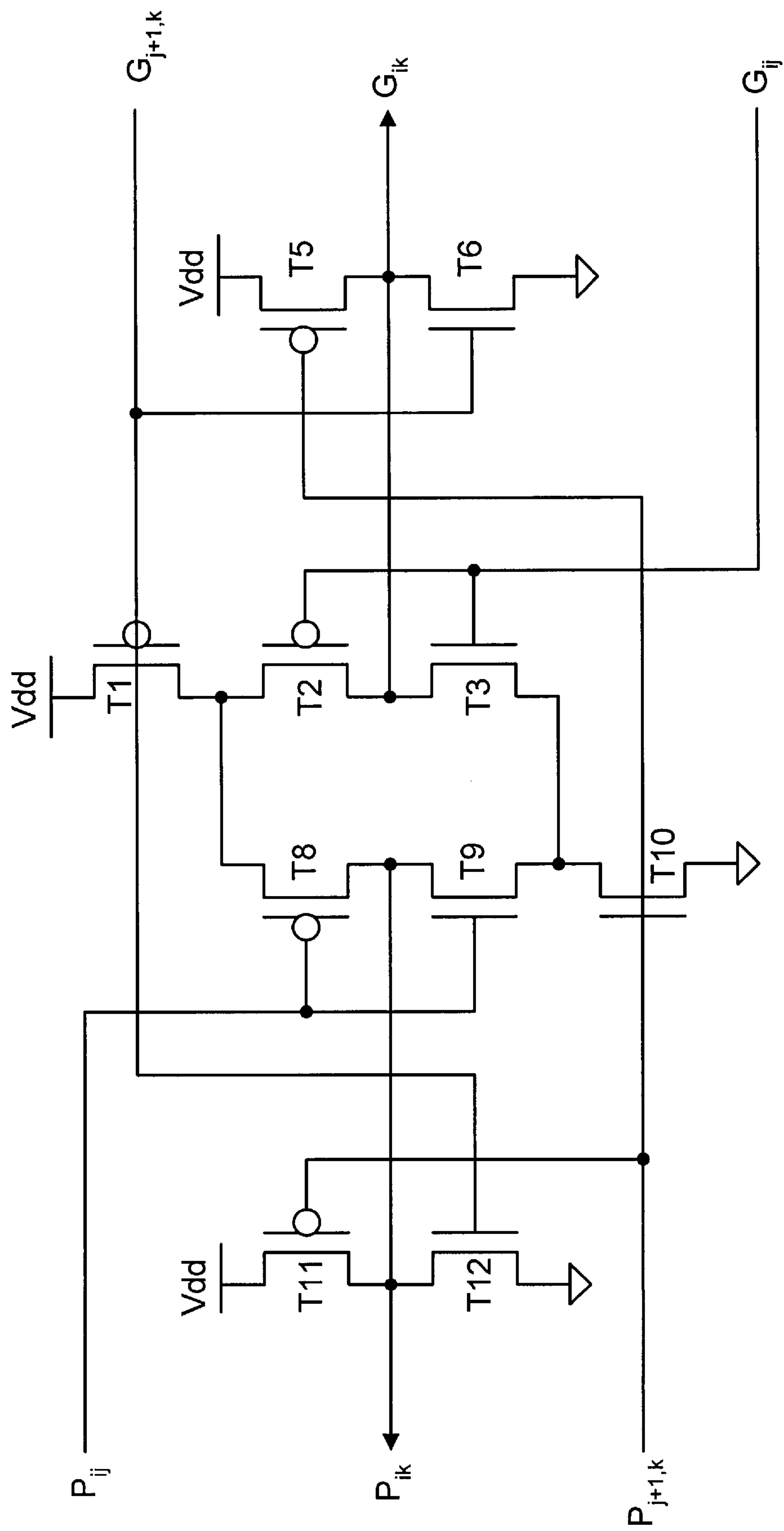
FIG. 4 is a circuit diagram of an improved combination generate and propagate circuit.

Turning now to FIG. 4, a combination generate and propagate circuit according to one embodiment of the present invention is shown. When the propagate and generate circuits of FIGS. 3A and 3B are combined, several transistors are redundant. For example, T1 and T7 are both coupled to Vdd and $G_{j+1k}$. Similarly, transistors T4 and T10 are both coupled to ground and $P_{j+1k}$. Combining the generate and propagate circuit allows the redundant transistors to be eliminated, thereby reducing the number of transistors to implement the generate and propagate circuit. In the illustrated embodiment, the number of transistors to implement the generate and propagate circuits is reduced from 12 to 10. Transistor T7 is eliminated and the source of transistor T1 is coupled to both transistor T2 and T8. Likewise, transistor T4 is eliminated and the source of transistor T10 is coupled to both of T3 and of T9.

In some combinations of inputs, transistors T1 and T10 may have to drive both the propagate and generate output. For example, if $G_{j+1k}$, $P_{ij}$ and $G_{ij}$ are all low, transistor T1 must drive the generate output through transistor T2 and the propagate output through transistor T8. In one embodiment, transistor T1 is designed to be twice the size of transistor T1 of FIG. 2A. The current drive of a transistor is proportional to the size of the transistor. Increasing the size of T1 provides sufficient current to drive both the generate and propagate outputs when the condition arises. In this embodiment, eliminating transistor T7 does not provide a significant reduction in the silicon area required to implement the combination of propagate and generate circuit. This embodiment, however, does increase the speed of the propagate generate circuit under certain conditions. For example, if inputs $G_{j+1k}$ and $G_{ik}$ are low and input $P_{ij}$ is high, transistor T1 drives the generate output through transistor T2. In this situation, transistor T1 is only driving one output, therefore, the additional current of the larger transistor leads to less propagation delay in the assertion of the generate output. Likewise, when $G_{j+1k}$ and $P_{ij}$ are low and $G_{ij}$ is high, T1 drives the propagate output through transistor T8. Because T1 is only driving one output, the propagation delay in asserting the propagate output is reduced.

Similarly, T10 replaces transistors T4 and T10 of FIGS. 3A and 3B. T10 in FIG. 4 may be designed to be twice as large as T10 in FIG. 3B. In a manner similar to that discussed above with reference to T1, when T10 drives only one output, T10 is able to sink twice as much current, thereby reducing the propagation delay in deasserting the propagate output or, the generate output.

Figure 1B:
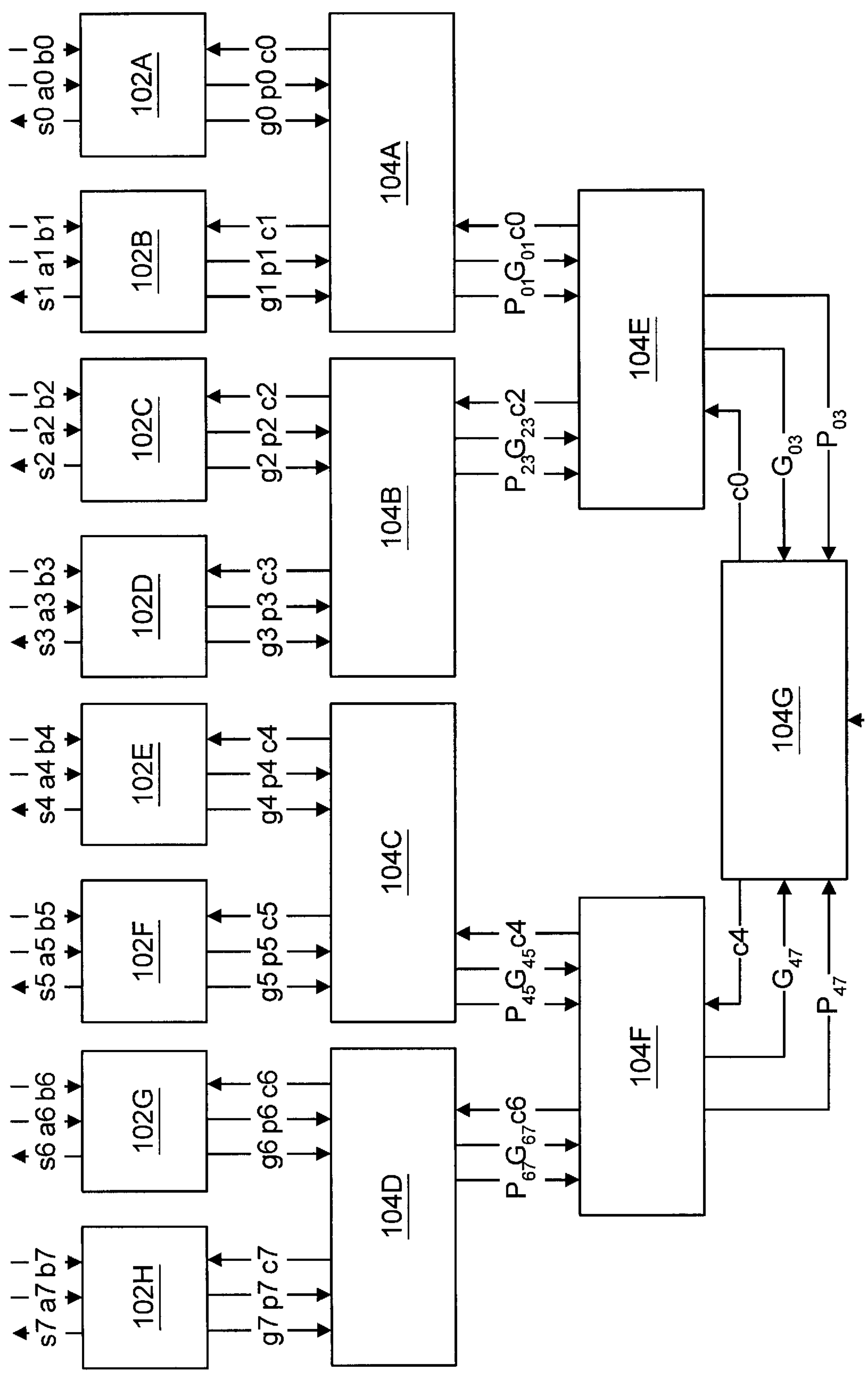
FIG. 1B is a block diagram of one embodiment of a carry lookahead tree adder.
Figure 5:
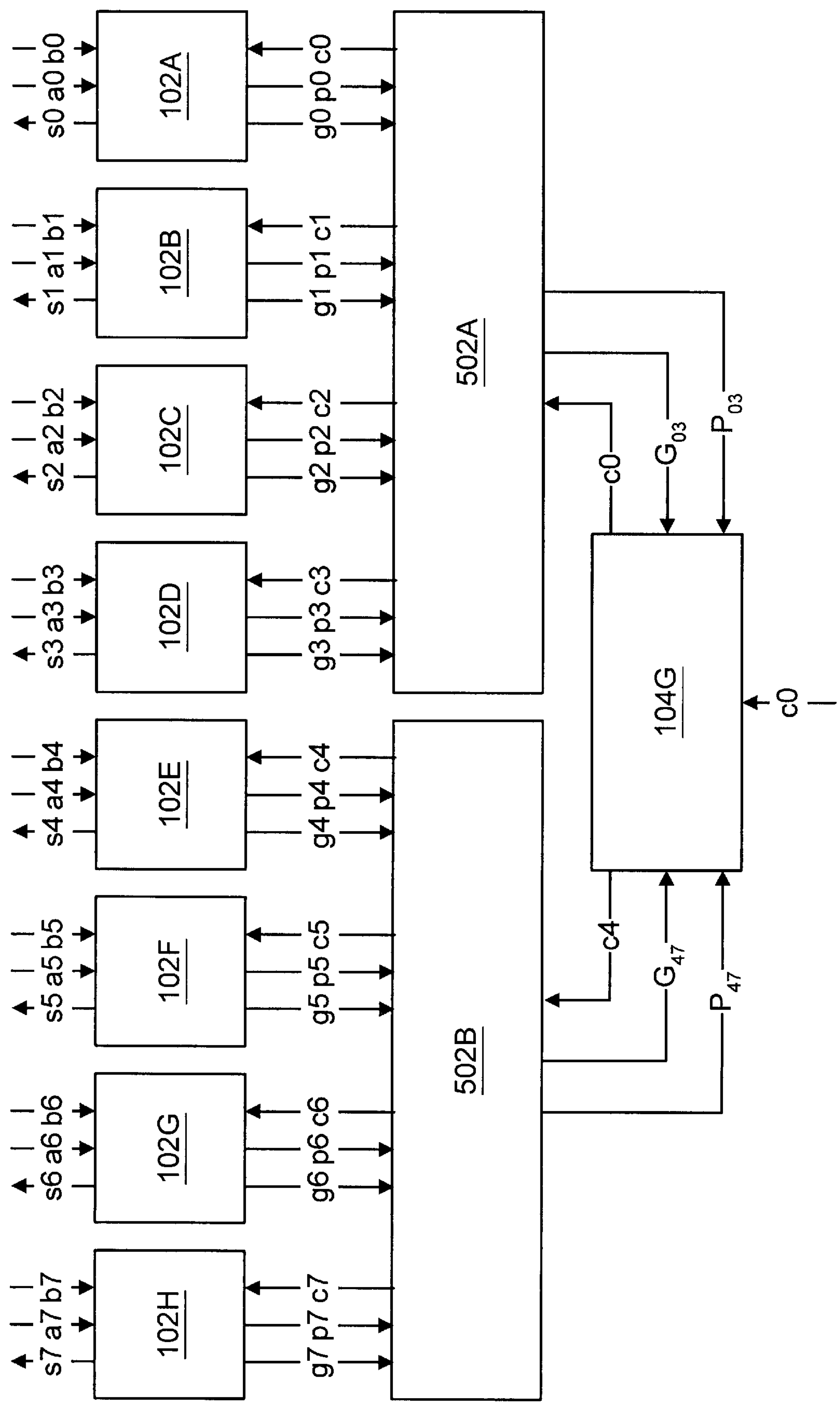
FIG. 5 is a block diagram of one embodiment of a quadrature carry lookahead tree adder.

Turning now to FIG. 5, a block diagram of a quadrature (or radix-4) carry lookahead tree adder is shown. Carry lookahead tree adders may be implemented with different levels of integration than the binary tree structure shown in FIG. 1B. FIG. 5 illustrates a quadrature tree structure. Tree stages 502A and 502B each receive propagate and generate inputs from four tree stages. The quadrature tree structure requires more complicated gates to implement each stage, but reduces the number of stages, thereby reducing the propagation delay of the adder. For example, tree stage 502A calculates G03 and P03 from the outputs of tree stages 102A–102D. Comparing FIG. 5 to FIG. 1B, tree stage 502A replaces tree stages 104A, 104B and 104E. Although FIG. 5 illustrates an 8-bit adder, the quadrature tree structure is better suited for 16-bit adders. In a 16-bit adder, the last stage, stage 104G, would be replaced with a quadrature tree stage and the tree stage would receive propagate and generate inputs from stages 502A, 502B and two other quadrature tree stages. In this manner, a 16-bit adder is implemented with three levels of circuitry. In contrast, the binary tree structure illustrated in FIG. 1B would require five levels of circuitry to implement a 16-bit adder.

Figure 6:
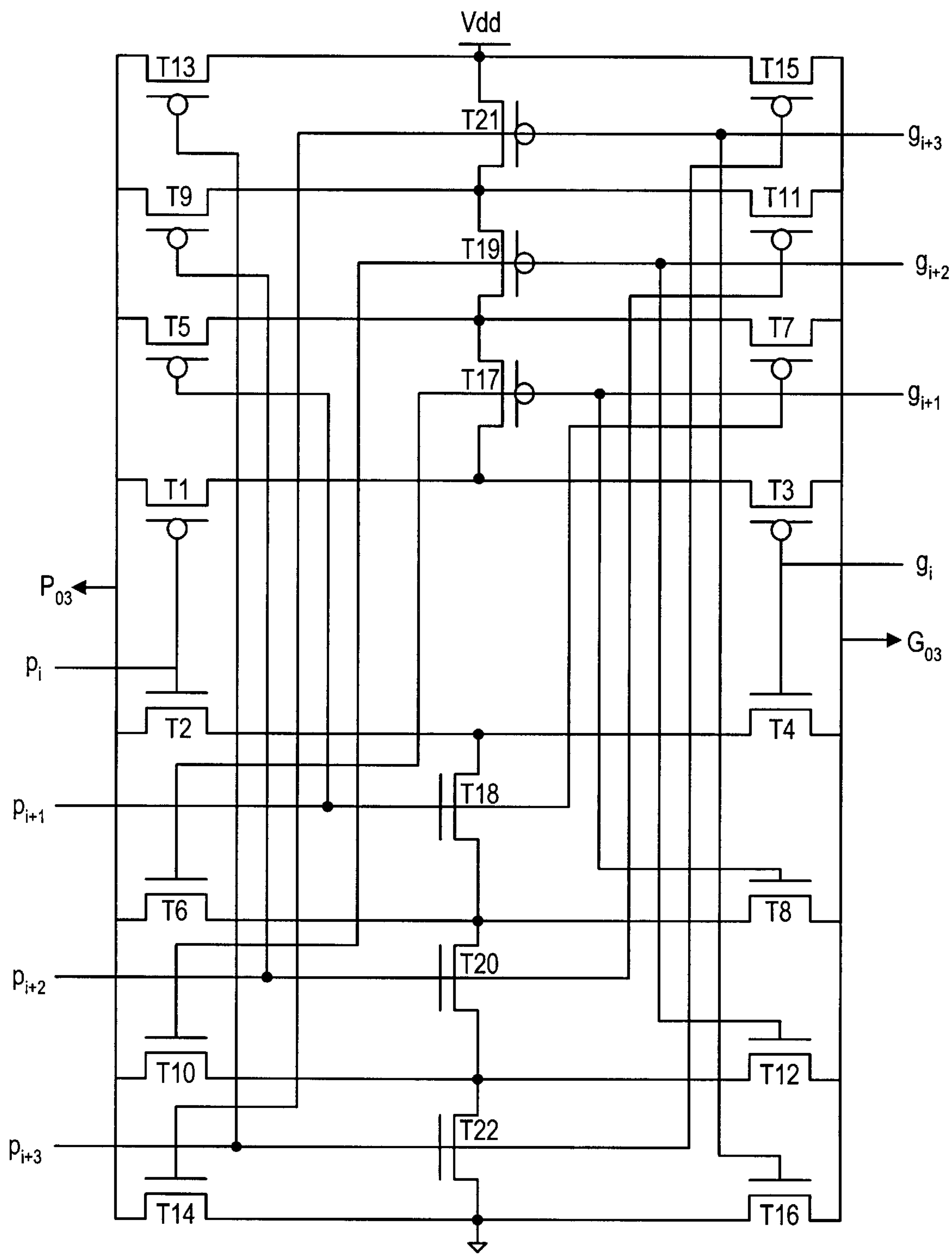
FIG. 6 is a circuit diagram of a combination propagate and generate circuit for the adder of FIG. 5.

Turning now to FIG. 6, a circuit diagram of a combination propagate and generate circuit for a quadrature tree structure is shown. The quadrature tree stage receives four propagate inputs ($p_i$ through $p_{i+3}$) and four generate inputs ($g_i$ through $g_{i+3}$). The quadrature tree stage includes 22 switches (T1 through T22). The quadrature tree structure advantageously reduces the number of transistor required to implement the propagate and generate circuit. Comparing the binary tree stage of FIG. 4 to the quadrature tree stage of FIG. 6, the quadrature tree stage replaces three binary tree stages. The quadrature tree stage requires 22 transistors while the three binary tree stages that the quadrature tree stage replaces require a total of 30 transistors.

T1 is operably coupled between a propagate output, a first propagate input and a third node. T2 is operably coupled between the propagate output, the first propagate input and a fourth node. T3 is operably coupled between a generate output, a first generate input and the third node. T4 is operably coupled between the generate output, the first generate input and the fourth node. T5 is operably coupled between the propagate output, a second propagate input and a fifth node. T6 is operably coupled between the propagate output, the second generate input and a fifth node. T7 is operably coupled between the generate output, a second propagate input and the fifth node. T8 is operably coupled between the generate output, the second generate input and the sixth node. T9 is operably coupled between the propagate output, a third propagate input and a seventh node. T10 is operably coupled between the propagate output, a third generate input and a eighth node. T11 is operably coupled between the generate output, the third propagate input and the seventh node. T12 is operably coupled between the generate output, the third generate input and the eighth node. T13 is operably coupled between the propagate output, a fourth propagate input and Vdd. T14 is operably coupled between the propagate output, a fourth generate input and ground. T15 is operably coupled between the generate output, the fourth propagate input and Vdd. T16 is operably coupled between the generate output, the fourth generate input and ground. T17 is operably coupled between the third node, the second generate input and the fifth node. T18 is operably coupled between the fourth node, the second propagate input and the sixth node. T19 is operably coupled between the fifth node, the third generate input and the seventh node. T20 is operably coupled between the sixth node, the third propagate input and the eighth node. T21 is operably coupled between the seventh node, the fourth generate input and Vdd. T22 is operably coupled between the eighth node, the fourth propagate input and ground.

Although only radix-2 (FIG. 3C) and radix-4 (FIG. 6) generate and propagate circuits have been shown, the present invention contemplates combination generate and propagate circuits of any radix.

Numerous variations and modifications will become apparent to those skilled in the art once the above disclosure is fully appreciated. It is intended that the following claims be interpreted to embrace all such variations and modifications.

What is claimed is:

1. A combined generate and propagate circuit in a carry lookahead adder, comprising:

a generate output node;

a propagate output node;

a first pair of switches comprising a first switch coupled between a first potential and said propagate output node and a second switch coupled between said first potential and said generate output node;

a second pair of switches comprising a third switch coupled between a second potential and said propagate output node, and a fourth switch coupled between said second potential and said generate output node;

a third pair of switches comprising a fifth switch coupled between a third node and said propagate output node, and a sixth switch coupled between said third node and said generate output node;

a fourth pair of switches comprising a seventh switch coupled between a fourth node and said propagate output node, and an eighth switch coupled between said fourth node and said generate output node;

a ninth switch operably coupled between said first potential and said third node; and a tenth switch operably coupled between said second potential and said fourth node.

2. The combined generate and propagate circuit in a carry lookahead adder of claim 1 wherein said switches are transistors.

3. The combined generate and propagate circuit in a carry lookahead adder of claim 2 wherein said first, second, fifth, sixth and ninth switches are p-channel field effect transistors.

4. The combined generate and propagate circuit in a carry lookahead adder of claim 3 wherein said third, fourth, seventh, eighth and tenth switches are n-channel field effect transistors.

5. The combined generate and propagate circuit in a carry lookahead adder of claim 2 wherein said ninth switch is larger than said sixth switch.

6. The combined generate and propagate circuit in a carry lookahead adder of claim 5 wherein said ninth switch is approximately twice as large as said sixth switch.

7. The combined generate and propagate circuit in a carry lookahead adder of claim 2 wherein said second switch is smaller than said sixth switch.

8. The combined generate and propagate circuit in a carry lookahead adder of claim 7 wherein said second switch is approximately half as large as said sixth switch.

9. The combined generate and propagate circuit in a carry lookahead adder of claim 1 further comprising a first propagate input operably coupled to said fifth switch and said seventh switch.

10. The combined generate and propagate circuit in a carry lookahead adder of claim 9 further comprising a second propagate input operably coupled to said first switch, said second switch and said tenth switch.

11. The combined generate and propagate circuit in a carry lookahead adder of claim 10 further comprising a first generate input operably coupled to said sixth switch and said eighth switch.

12. The combined generate and propagate circuit in a carry lookahead adder of claim 11 further comprising a second generate input operably coupled to said third switch, said fourth switch and said ninth switch.

13. The combined generate and propagate circuit in a carry lookahead adder of claim 12 wherein said first propagate input, said second propagate input, said first generate input, and said second generate input are coupled to a gate input of said respective switches.

14. The combined generate and propagate circuit in a carry lookahead adder of claim 1 wherein said first potential is a 3.3 volts.

15. The combined generate and propagate circuit in a carry lookahead adder of claim 14 wherein said second potential is ground.

16. A combined generate and propagate circuit in a carry lookahead adder, comprising:

a generate output node;

a propagate output node;

a first switch coupled between a third node and said propagate output node;

a second switch coupled between a fourth node and said propagate output node;

a third switch coupled between said third node and said generate output node;

a fourth switch coupled between said fourth node and said generate output node;

a fifth switch coupled between a fifth node and said propagate output node;

a sixth switch coupled between a sixth node and said propagate output node;

a seventh switch coupled between said fifth node and said generate output node;

a eight switch coupled between said sixth node and said generate output node;

a ninth switch coupled between a seventh node and said propagate output node;

a tenth switch coupled between a eighth node and said propagate output node;

a eleventh switch coupled between said seventh node and said generate output node;

a twelfth switch coupled between said eighth node and said generate output node;

a thirteenth switch coupled between a first potential and said propagate output node;

a fourteenth switch coupled between a second potential and said propagate output node;

a fifteenth switch coupled between said first potential and said generate output node;

a sixteenth switch coupled between said second potential and said generate output node;

a seventeenth switch operably coupled between said third node and said fifth node; and a eighteenth switch operably coupled between said fourth node and said sixth node;

a nineteenth switch operably coupled between said fifth node and said seventh node;

a twentieth switch operably coupled between said sixth node and said eighth node;

a twenty-first switch operably coupled between said seventh node and said first potential;

a twenty-second switch operably coupled between said eighth node and said second potential.

17. The combined generate and propagate circuit in a carry lookahead adder of claim 16 wherein said switches are transistors.

18. The combined generate and propagate circuit in a carry lookahead adder of claim 16 further comprising:

a first propagate input operably coupled to said first switch and said second switch;

a second propagate input operably coupled to said fifth switch, said seventh switch and said eighteenth switch;

a third propagate input operably coupled to said ninth switch, said eleventh switch and said twentieth switch;

a fourth propagate input operably coupled to said thirteenth switch, said fifteenth switch and said twenty-second switch;

a first generate input operably coupled to said third switch and said fourth switch;

a second generate input operably coupled to said sixth switch, said eighth switch and said seventeenth switch;

a third generate input operably coupled to said tenth switch, said twelfth switch and said nineteenth switch;

a fourth generate input operably coupled to said fourteenth switch, said sixteenth switch and said twenty-first switch.

19. The combined generate and propagate circuit in a carry lookahead adder of claim 16 wherein said first potential is 3.3 volts.

20. The combined generate and propagate circuit in a carry lookahead adder of claim 19 wherein said second potential is ground.

* * * * *